US011221803B2

(12) United States Patent
Kawanishi

(10) Patent No.: US 11,221,803 B2
(45) Date of Patent: Jan. 11, 2022

(54) IMAGE FORMING APPARATUS, METHOD OF CONTROLLING IMAGE FORMING APPARATUS, AND STORAGE MEDIUM THAT ENABLES A USER TO PRINT REMAINING PRINT DATA WHEN THERE REMAINS HELD PRINT DATA AFTER A POST-AUTHENTICATION AUTOMATIC PRINTING

(71) Applicant: CANON KABUSHIKI KAISHA, Tokyo (JP)

(72) Inventor: Masaki Kawanishi, Yokohama (JP)

(73) Assignee: Canon Kabushiki Kaisha, Tokyo (JP)

( * ) Notice: Subject to any disclaimer, the term of this patent is extended or adjusted under 35 U.S.C. 154(b) by 0 days.

(21) Appl. No.: 16/418,684

(22) Filed: May 21, 2019

(65) Prior Publication Data

US 2019/0361635 A1 Nov. 28, 2019

(30) Foreign Application Priority Data

May 24, 2018 (JP) .............................. JP2018-100076

(51) Int. Cl.
*G06F 3/12* (2006.01)
*H04N 1/00* (2006.01)

(52) U.S. Cl.
CPC .......... *G06F 3/1204* (2013.01); *G06F 3/1238* (2013.01); *G06F 3/1257* (2013.01); *G06F 3/1267* (2013.01); *G06F 3/1286* (2013.01); *H04N 1/00506* (2013.01)

(58) Field of Classification Search
CPC .... H04N 1/0035–00517; G06F 3/1238; G06F 3/1204; G06F 3/1267; G06F 3/1257
See application file for complete search history.

(56) References Cited

U.S. PATENT DOCUMENTS

| 9,665,319 B2* | 5/2017 | Nakajima | ............. G06F 3/1218 |
| 2005/0099646 A1* | 5/2005 | Jeyachandran | ....... G06F 3/1204 358/1.14 |
| 2013/0125234 A1* | 5/2013 | Nishiyama | ......... H04N 1/32048 726/21 |
| 2014/0233053 A1* | 8/2014 | Kakutani | ............. G06F 3/1285 358/1.14 |
| 2017/0371601 A1* | 12/2017 | Kaneko | ............. H04N 1/00233 |

FOREIGN PATENT DOCUMENTS

JP 2011-223180 A 11/2011

* cited by examiner

*Primary Examiner* — Nicholas Pachol
(74) *Attorney, Agent, or Firm* — Canon U.S.A., Inc., IP Division

(57) ABSTRACT

An image forming apparatus includes a printing device, a display device, at least one memory that stores a set of instructions, and at least one processor that executes the instructions, the instructions, when executed, causing the image forming apparatus to perform operations including, in a case where print data that is associated with a login user and is excluded from a target of printing in response to the login is stored in the at least one storage, displaying a selection screen that receives an operation for selecting one or more print data at least including the print data excluded from the target of printing on the display device.

5 Claims, 25 Drawing Sheets

FIG.6

USER MANAGEMENT LIST 601

| USER NAME | PASSWORD | E-MAIL ADDRESS | DEPARTMENT ID | ROLE NAME |
|---|---|---|---|---|
| Administrator | passadmin | administrator@abc.co.jp | | Administrator |
| User1 | pass1 | user1@abc.co.jp | 00000001 | GeneralUser |
| User2 | pass2 | user2@abc.co.jp | 00000001 | GeneralUser |
| User3 | pass3 | user3@abc.co.jp | 00000002 | GeneralUser |

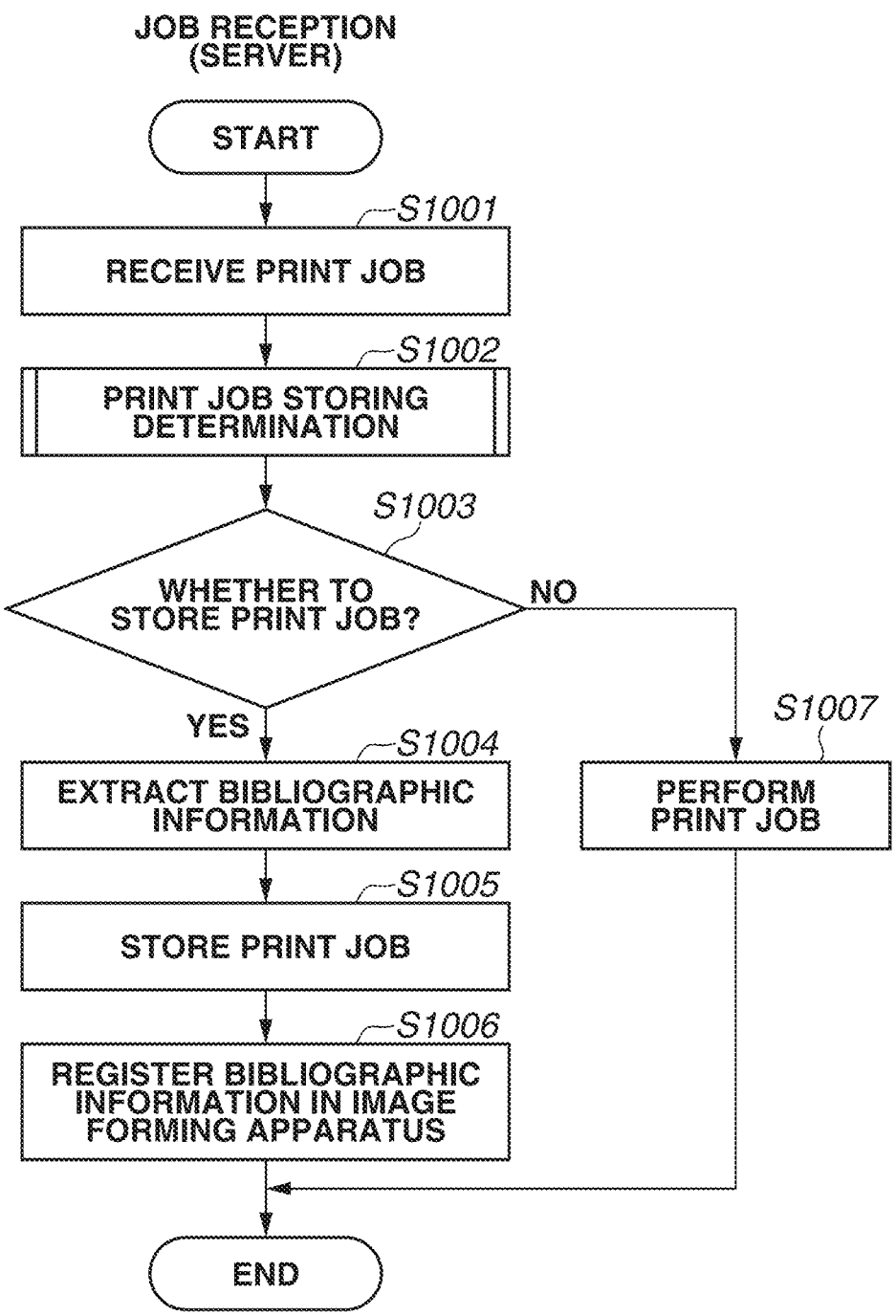

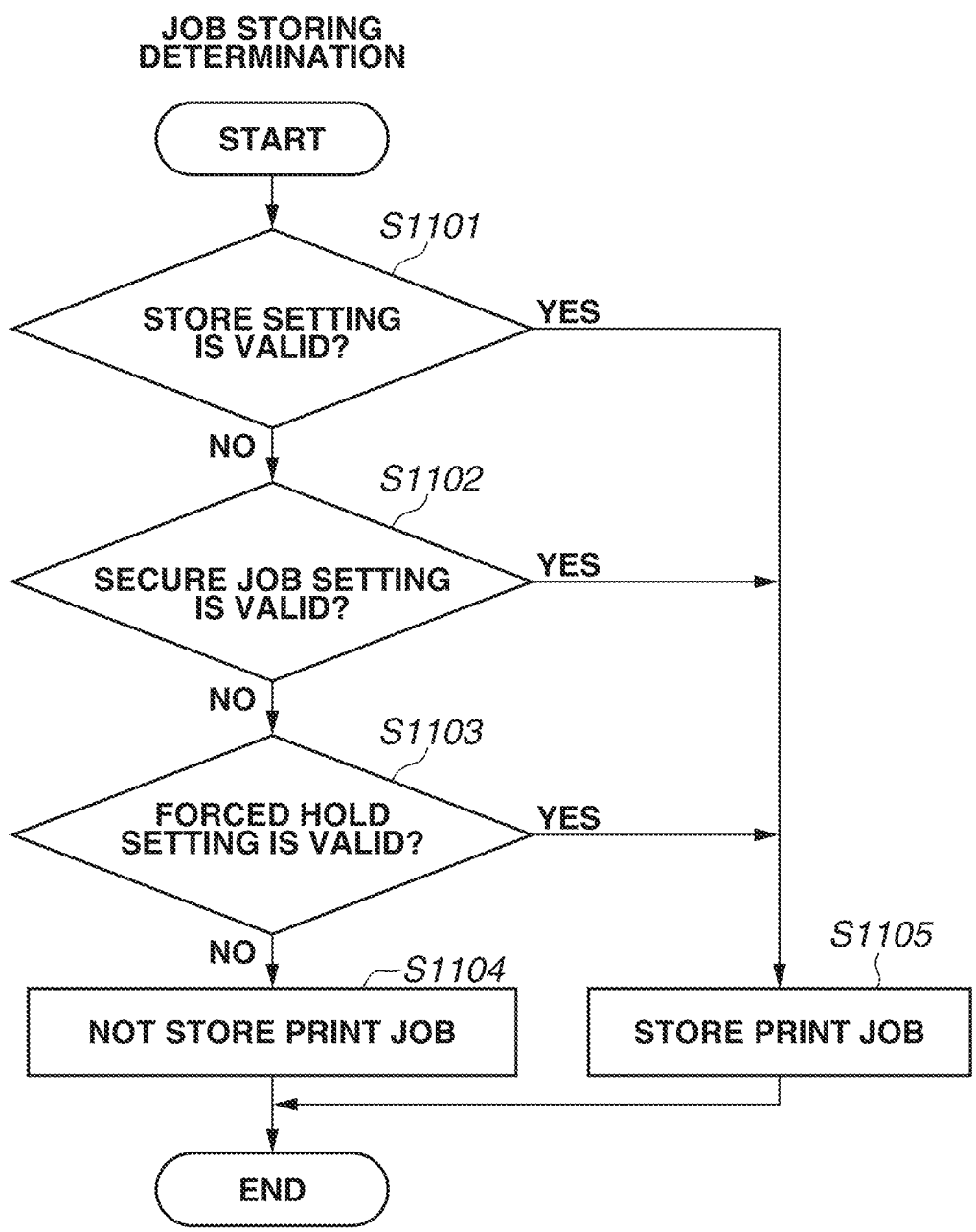

FIG.12

BIBLIOGRAPHIC INFORMATION LIST 1201

| 1202 | 1203 | 1204 | 1205 | 1206 | 1207 | 1208 | |
|---|---|---|---|---|---|---|---|
| DATE | USER NAME | STORAGE | PRINT JOB NAME | PRINT SETTING | PRINT JOB TYPE | PASSWORD | |
| 2017/11/10 10:34:45 | User1 | /data/User1/doc1 | AAA.txt | SINGLE SIDE 1 COPY MONOCHROME | NORMAL JOB | | 1209 |
| 2017/11/10 13:50:22 | User1 | /data/User1/doc2 | BBB.pdf | DOUBLE SIDES 3 COPIES COLOR | NORMAL JOB | | 1210 |
| 2017/11/10 14:10:00 | User1 | /data/User1/doc3 | CCC.doc | DOUBLE SIDES 5 COPIES 2 in 1 COLOR | SECURE JOB | 111 | 1211 |
| 2017/11/10 14:12:00 | User1 | /data/User1/doc4 | DDD.doc | SINGLE SIDE 3 COPIES COLOR | SECURE JOB | 222 | 1212 |
| 2017/11/10 14:15:00 | User2 | /data/User2/doc1 | EEE.doc | SINGLE SIDE 3 COPIES COLOR | NORMAL JOB | | 1213 |
| 2017/11/10 14:16:00 | User2 | /data/User2/doc2 | FFF.doc | SINGLE SIDE 3 COPIES COLOR | SECURE JOB | 333 | 1214 |
| 2017/11/10 15:30:00 | User2 | /data/User2/doc3 | GGG.doc | SINGLE SIDE 3 COPIES COLOR | NORMAL JOB | | 1215 |
| 2017/11/10 15:30:00 | User2 | /data/User2/doc4 | HHH.doc | SINGLE SIDE 3 COPIES COLOR | SECURE JOB | 444 | 1216 |

FIG.23

| SELECT JOB | | READY TO PRINT ~2301 | PRINTED ~2302 | RESERVED PRINTING ~2303 | UPDATE ~2304 |
|---|---|---|---|---|---|
| JOB NAME/PRINT SETTING ~2305 | DATE ~2306 | NUMBER OF SHEETS × NUMBER OF COPIES ~2307 | JOB TYPE ~2308 | USER NAME ~2309 | |
| AAA.txt SINGLE SIDE MONOCHROME | 2017/11/10 10:34:45 | 20 × 1 | | User1 ~2317 | |
| BBB.pdf DOUBLE SIDES COLOR | 2017/11/10 13:50:22 | 10 × 3 | | User1 ~2318 | |
| CCC.docx DOUBLE SIDES 2 in 1 COLOR | 2017/11/10 14:10:00 | 32 × 5 | SECURE | User1 ~2319 | |
| DDD.docx SINGLE SIDE COLOR | 2017/11/10 14:12:00 | 32 × 3 | SECURE | User1 ~2320 | |

2310 — ☐ SELECT ALL ~2312

NUMBER OF SELECTIONS: 0
TOTAL: 4

| PRINT SETTING ~2311 | IMAGE DISPLAY | JOB DELETION ~2313 | PRINT CANCEL ~2314 | PRINT START ~2315 |
|---|---|---|---|---|

LOGOUT ~2316

FIG.24

| SELECT JOB | | | | | | |
|---|---|---|---|---|---|---|
| 2405 | READY TO PRINT (2401) | PRINTED (2402) | RESERVED PRINTING (2403) | | | UPDATE (2404) |
| JOB NAME/PRINT SETTING | DATE (2406) | NUMBER OF SHEETS × NUMBER OF COPIES (2407) | JOB TYPE (2408) | USER NAME (2409) | | |
| CCC.docx DOUBLE SIDES 5 COPIES 2 in 1 COLOR | 2017/11/10 14:10:00 | 32 × 1 | SECURE | User1 | | ← 2417 |
| DDD.docx SINGLE SIDE 3 COPIES COLOR | 2017/11/10 14:12:00 | 32 × 1 | SECURE | User1 | | ← 2418 |

2410

NUMBER OF SELECTIONS: 0    TOTAL: 2

☐ SELECT ALL (2412)

| PRINT SETTING (2411) | IMAGE DISPLAY | JOB DELETION (2413) | PRINT CANCEL (2414) | PRINT START (2415) |
|---|---|---|---|---|

LOGOUT (2416)

2400

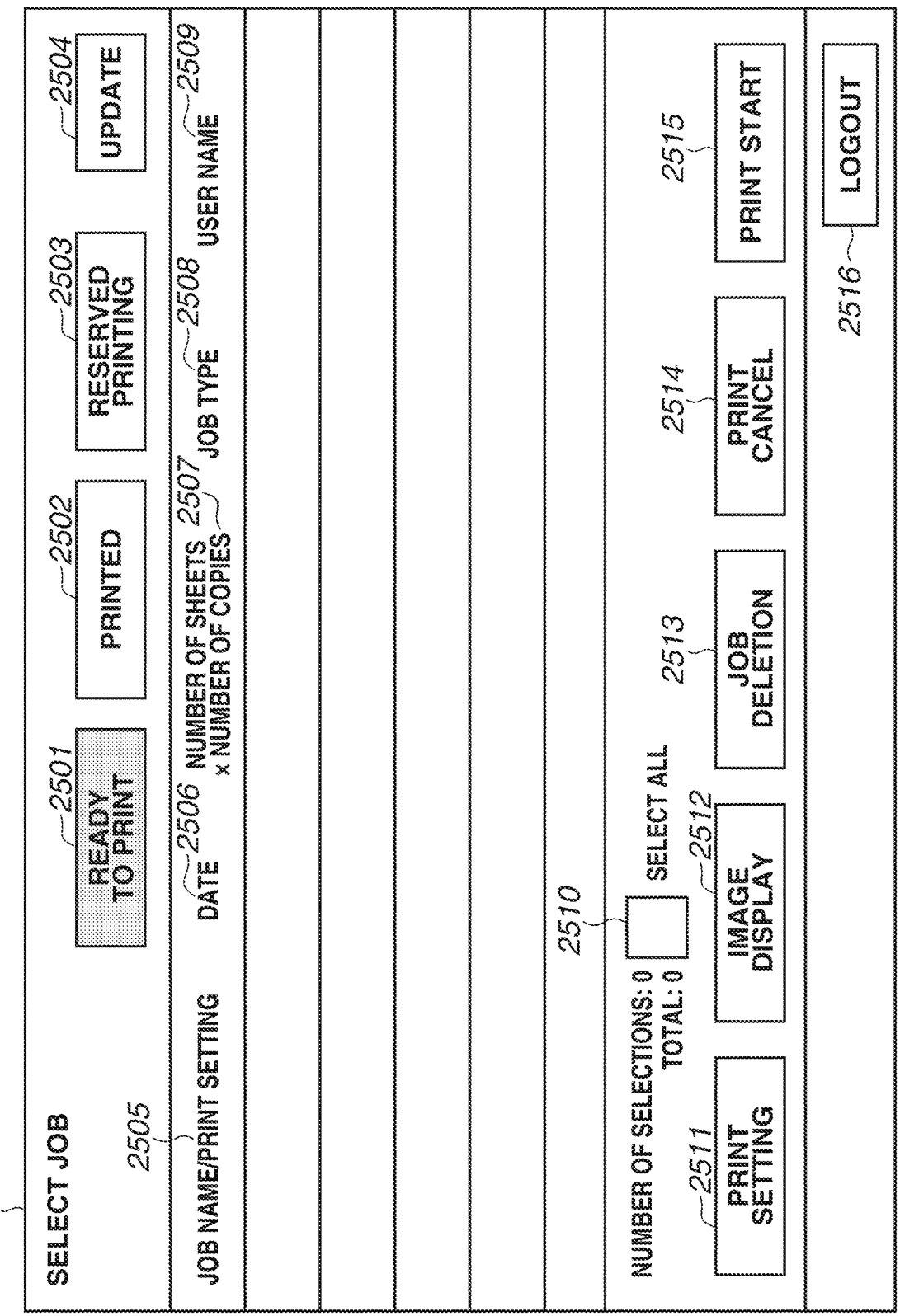

IMAGE FORMING APPARATUS, METHOD OF CONTROLLING IMAGE FORMING APPARATUS, AND STORAGE MEDIUM THAT ENABLES A USER TO PRINT REMAINING PRINT DATA WHEN THERE REMAINS HELD PRINT DATA AFTER A POST-AUTHENTICATION AUTOMATIC PRINTING

BACKGROUND OF THE INVENTION

Field of the Invention

The present disclosure relates to an image forming apparatus, a method of controlling an image forming apparatus, and a storage medium.

Description of the Related Art

In order to enhance security, some image forming apparatuses have a function for hold printing. By the function for hold printing, a print job input from a printer driver is temporarily held in a hard disk provided in the image forming apparatus and the held print job is output after a user is authenticated. In the hold printing, after the user is authenticated, the user selects a print job to be printed from a print job list displayed on an operation unit and instructs the image forming apparatus to print the selected print job. Accordingly, the user is required some operations for starting printing.

Examples of a method to reduce user's operations in the hold printing include a post-authentication automatic printing function. Japanese Patent Application Laid-Open No. 2011-223180 discusses a function with which printing of a print job of an authenticated user is automatically started after authentication in the image forming apparatus.

SUMMARY OF THE INVENTION

According to an aspect of the present disclosure, an image forming apparatus that performs printing of print data which is stored in at least one storage in association with user information, the image forming apparatus includes a printing device, a display device, at least one memory that stores a set of instructions, and at least one processor that executes the instructions, the instructions, when executed, causing the image forming apparatus to perform operations including causing, in response to login of a user to the image forming apparatus, the printing device to perform printing processing of print data associated with user information corresponding to the login user from among print data stored in the at least one storage, and in a case where print data that is associated with the login user and is excluded from a target of printing in response to the login is stored in the at least one storage, displaying a selection screen that receives an operation for selecting one or more print data at least including the print data excluded from the target of printing on the display device, and in a case where the print data that is associated with the login user and is excluded from the target of printing in response to the login is not stored in the at least one storage, displaying another screen different from the selection screen on the display device.

Further features of the present disclosure will become apparent from the following description of exemplary embodiments with reference to the attached drawings.

BRIEF DESCRIPTION OF THE DRAWINGS

FIG. 6 is a table illustrating an example of a user management list managed by the image forming apparatus.

FIG. 10 is a flowchart illustrating an example of print job storing processing.

FIG. 11 is a flowchart illustrating an example of print job storing determination.

FIG. 12 is a diagram illustrating an example of a bibliographic information table.

FIG. 23 is a diagram illustrating an example of a print function screen.

FIG. 24 is a diagram illustrating an example of the print function screen.

FIG. 25 is a diagram illustrating an example of the print function screen.

DESCRIPTION OF THE EMBODIMENTS

In a case where a print job that is excluded from a target of post-authentication automatic printing is included in held print jobs when post-login automatic printing is performed, the excluded print job is not printed and remains in an image forming apparatus. In such a case, there is a demand that the remaining print job is printed. A description will be given of a mechanism according to the present exemplary embodiment that enables the user to immediately instruct the image forming apparatus to print remaining print data in a case where there remains held print data after the post-authentication automatic printing is performed. An exemplary embodiment of the present disclosure is described below with reference to drawings.

Figure 1:
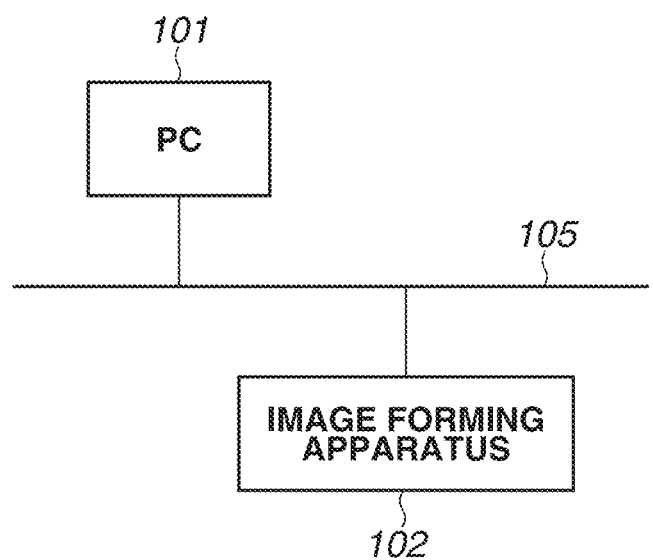
FIG. 1 is a diagram illustrating an example of a network configuration.

FIG. 1 is a diagram illustrating an example of a network configuration according to the exemplary embodiment of the present disclosure. A personal computer (PC) 101 that inputs a print job and an image forming apparatus (printing apparatus) 102 that processes the input print job are connected to a local area network (LAN) 105. The number of connected PCs and the number of connected image forming apparatuses are not limited thereto. The image forming apparatus 102 manages bibliographic information that is used for uniquely specifying a print job input from the PC 101. According to the present exemplary embodiment, an input source of the print job is the PC 101. Alternatively, the input source of the print job may be a device other than the PC (e.g., mobile terminal and other image forming apparatus).

The image forming apparatus 102 according to the present exemplary embodiment includes a post-authentication automatic printing function. The post-authentication automatic printing function is a function for printing print data stored in association with a user without waiting for a print instruction from the user, in response to login of the user to the image forming apparatus 102 via user authentication.

Further, the image forming apparatus 102 includes a function with which password verification of a print job for which a password has been set is skipped after the user authentication. The print job for which a password has been set has less compatibility with the post-authentication automatic printing that starts printing in response to the user authentication because the print job for which a password has been set normally requires password input when printing is instructed. More specifically, the print job for which a password has been set is desirably excluded from the target of the post-authentication automatic printing function. However, in a case where the function for skipping the password verification is valid, the print job for which a password has been set does not require the password input, and can be handled by the post-authentication automatic printing function.

Thus, according to the present exemplary embodiment, the print job for which a password has been set is also handled as the target of the post-authentication automatic printing in the case where the function for skipping the password verification is valid, while the print job for which a password has been set is excluded from the target of the post-authentication automatic printing in a case where the function for skipping the password verification is invalid. In the case where the function for skipping the password verification is invalid, the print job for which a password has been set remains after execution of the post-authentication automatic printing. In this case, a print job list is displayed after execution of the post-authentication automatic printing, which makes it possible to provide the image forming apparatus 102 that can reduce user's operation labor relating to printing and is excellent in usability.

Figure 2:
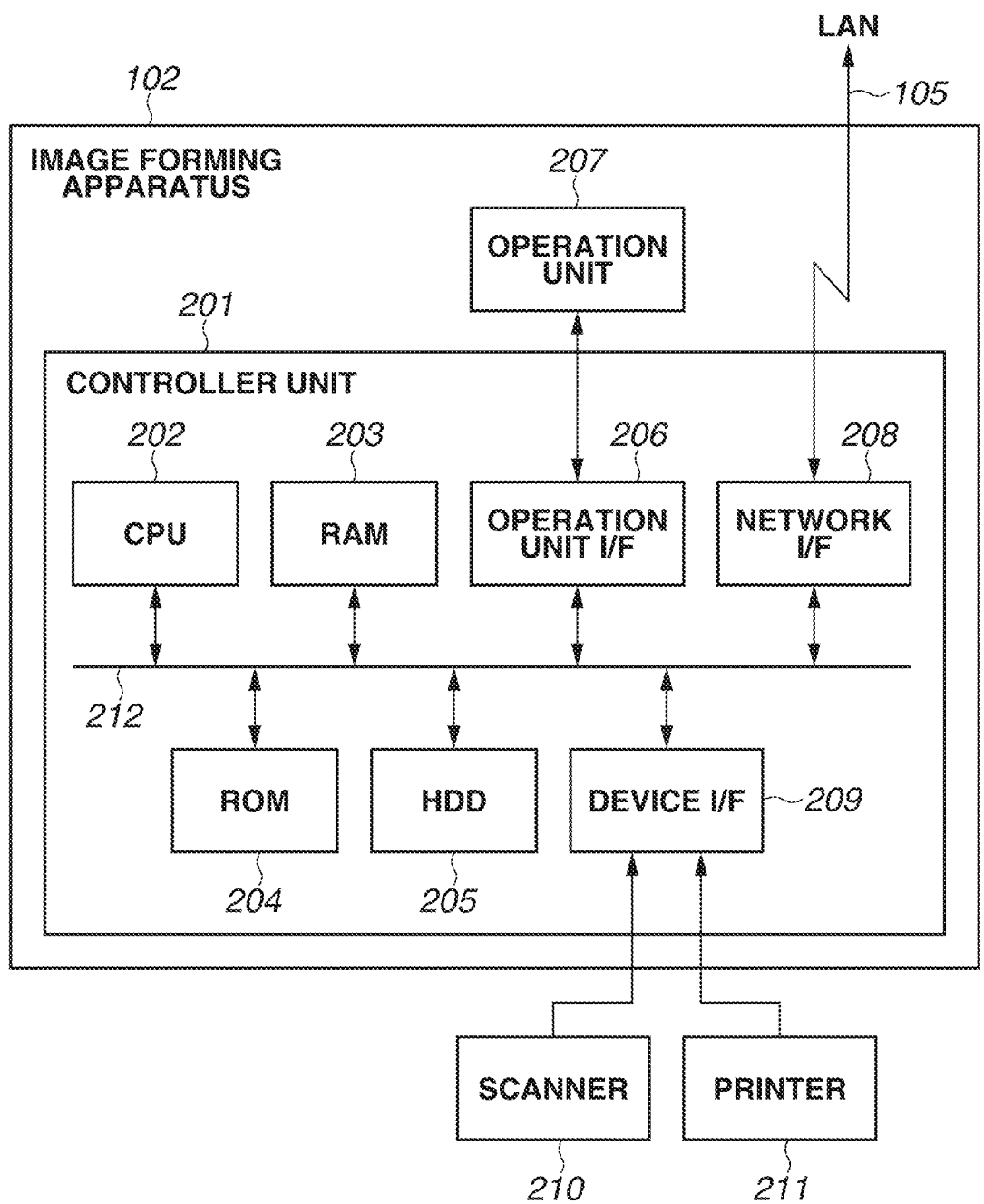
FIG. 2 is a block diagram illustrating an example of an entire configuration of an image forming apparatus.

FIG. 2 is a block diagram illustrating an entire configuration of the image forming apparatus 102. In a controller unit 201 of the image forming apparatus 102, a central processing unit (CPU) 202 is a computing unit that controls the entire system. A random access memory (RAM) 203 is a system work memory for operation of the CPU 202, and is an image memory temporarily storing image data. Further, the RAM 203 also stores programs and data of an operating system, system software, application software, etc. A read-only memory (ROM) 204 stores a boot program for the system. A hard disk drive (HDD) 205 stores the operating system, the system software, the application software, image data, setting data, etc. An operation unit interface (I/F) 206 is an interface for an operation unit 207, and outputs information to be displayed on the operation unit 207, to the operation unit 207. Further, the operation unit I/F 206 receives information input by the user via the operation unit 207. A network I/F 208 is connected to the network (LAN) 105, and performs input/output of information to/from the PC or the other image forming apparatus connected to the same LAN. A device I/F 209 connects the controller unit 201 with a scanner 210 and a printer 211 that are image input/output devices, and performs input/output of image data. The above-described devices are disposed on a system bus 212.

Figure 3:
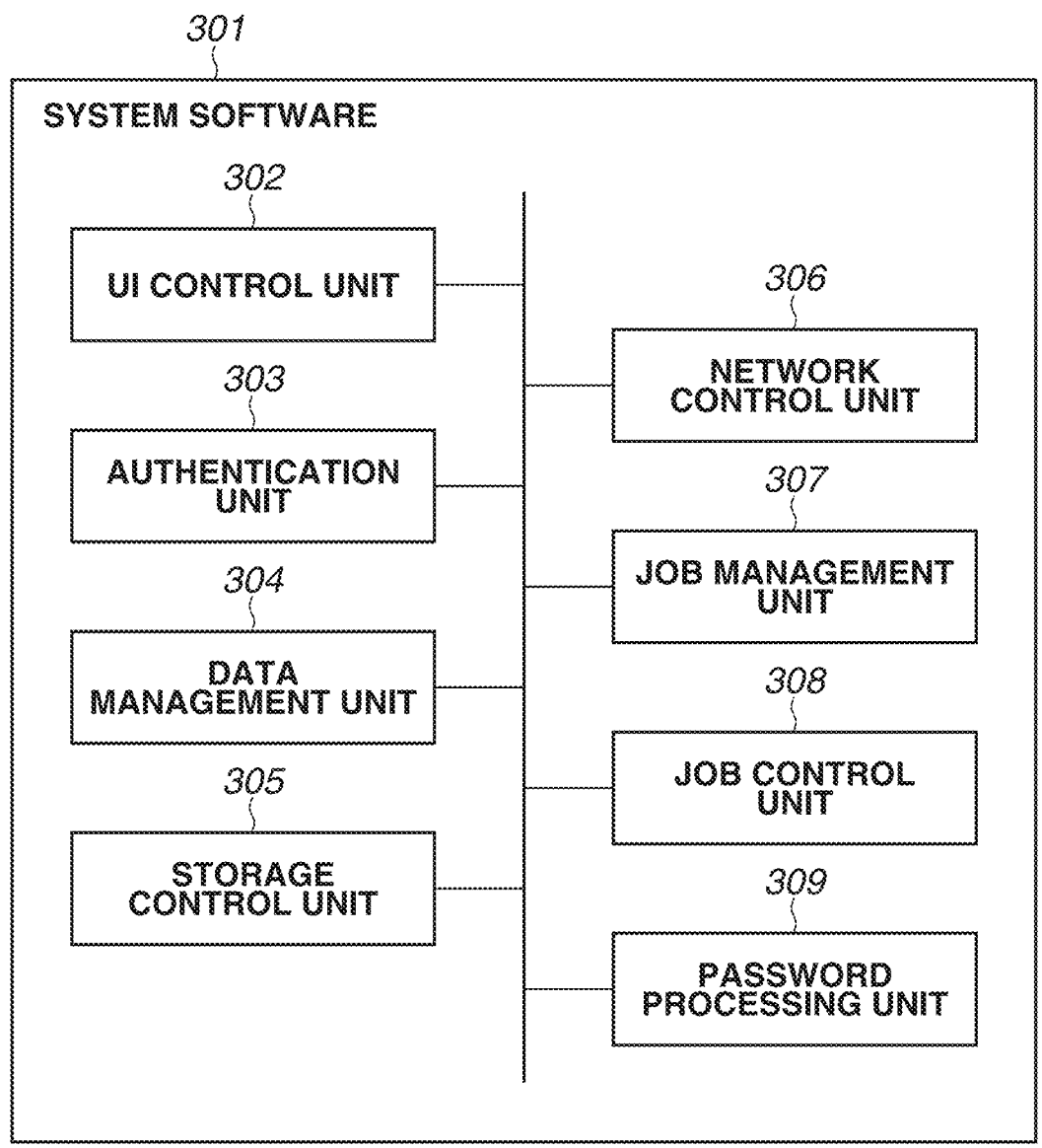
FIG. 3 is a block diagram illustrating an example of a functional configuration of system software in the image forming apparatus.

FIG. 3 is a block diagram illustrating a functional configuration of the system software of the image forming apparatus 102. A system software 301 is stored in any of storages such as the RAM 203, the ROM 204, and the HDD 205, and is executed by the CPU 202.

A user interface (UI) control unit 302 receives the information input by the user using the operation unit 207 via the operation unit I/F 206, and transmits the information to an authentication unit 303, a data management unit 304, and a job management unit 307. Further, the UI control unit 302 receives response from the authentication unit 303, the data management unit 304, and the job management unit 307, and outputs information about the response to the operation unit 207 via the operation unit I/F 206.

The authentication unit 303 performs user authentication processing based on authentication information received from the UI control unit 302, and returns a result of the user authentication processing.

The data management unit 304 receives data writing request and data reading request from the UI control unit 302, the network control unit 306, and the job management unit 307, and transmits data writing request and data reading request to a storage control unit 305. Further, the data management unit 304 receives response from the storage control unit 305, and transmits information about the response to the UI control unit 302, the network control unit 306, and the job management unit 307.

The storage control unit 305 receives data writing request and data reading request from the data management unit 304, performs data writing and data reading to and from the HDD 205, and returns a result of the data writing and the data reading to and from the data management unit 304.

The network control unit 306 receives request from the PC 101 or an optional image forming apparatus that is connected to the LAN 105, via the network I/F 208. Further, the network control unit 306 requests the data management unit 304 and the job management unit 307 to perform processing corresponding to the received request. Further, the network control unit 306 receives response from the data management unit 304 and the job management unit 307. The network control unit 306 transmits the received response to the PC 101 and the optional image forming apparatus that are connected to the LAN 105, via the network I/F 208.

The job management unit 307 receives job execution request from the UT control unit 302 and the network control unit 306 and manages jobs. Then, the job management unit 307 requests a job control unit 308 to execute a job. Further, the job management unit 307 transmits data writing request and data reading request to the data management unit 304. Furthermore, the job management unit 307 receives response from the data management unit 304 and the job control unit 308, and transmits a state of the job to the UT control unit 302 and the network control unit 306.

The job control unit 308 receives the job execution request from the job management unit 307, and controls operation of the scanner 210 and the printer 211 via the device I/F 209. Further, the job control unit 308 receives an operation state of each of the scanner 210 and the printer 211 via the device I/F 209, and transmits the operation state to the job management unit 307.

Figure 4:
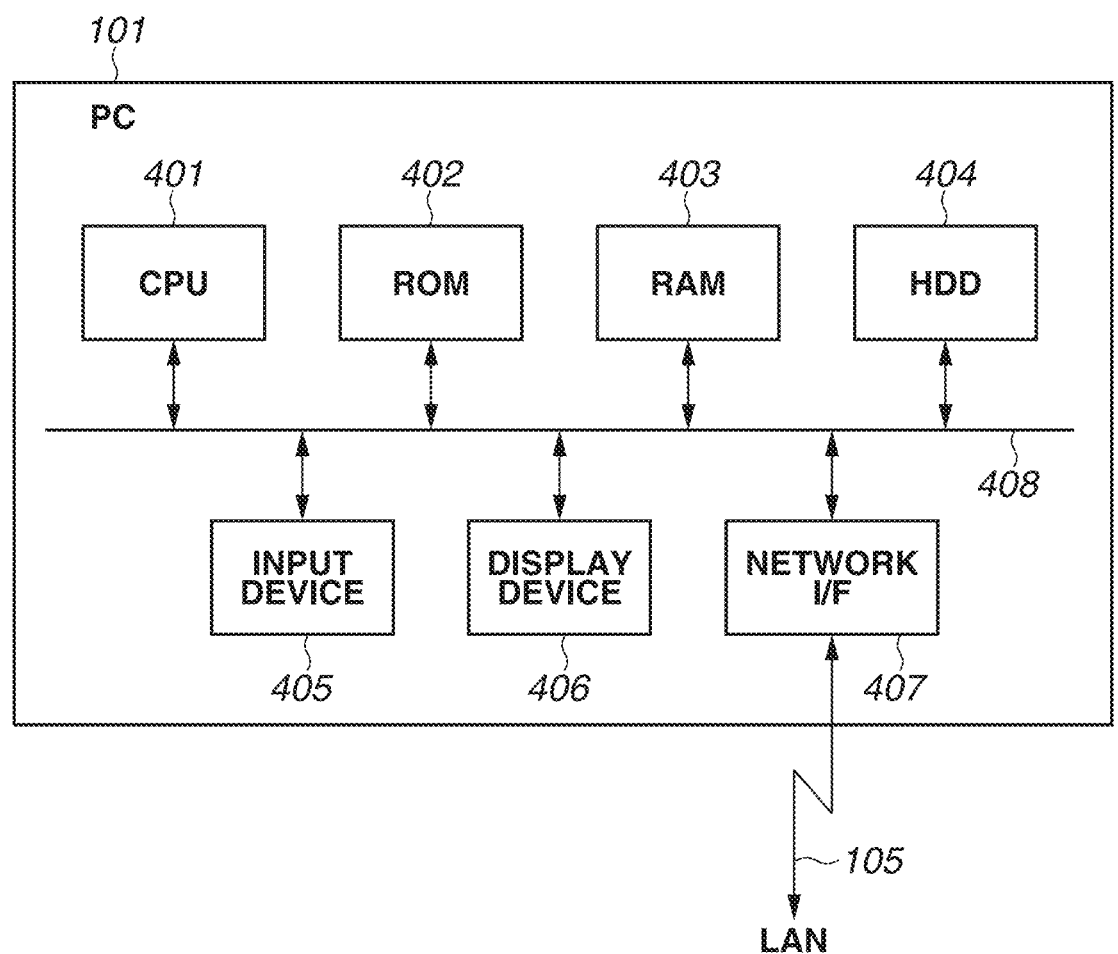
FIG. 4 is a block diagram illustrating an example of an entire configuration of a personal computer (PC).

FIG. 4 is a block diagram illustrating an entire configuration of the PC 101. In the PC 101, a CPU 401 is a computing unit that controls the entire system of the PC 101. A ROM 402 stores programs and data relating to processing. A RAM 403 is a system work memory for operation of the CPU 401, and is a memory temporarily storing data relating to the processing. An HDD 404 stores the programs and the data relating to the processing, temporary data, application data, etc. An input device 405 includes a keyboard and a pointing device that receive input of an instruction to the apparatus. A display device 406 displays an operation state of the apparatus and information output from programs operating in the apparatus. A network I/F 407 is connected to the network (LAN) 105 and performs input/output of information to/from the PC or the other image forming apparatus connected to the same LAN. These components are connected to a system bus 408.

The functions (or processing) of the operating system (OS) and the printer driver are achieved by the CPU 401 executing processing based on the program corresponding to the OS, the printer driver, and the application stored in the HDD 404.

Figure 5:
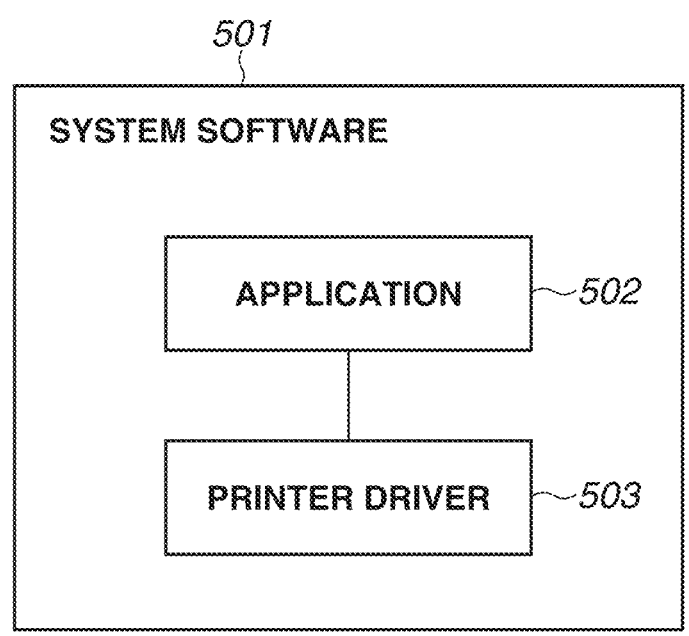
FIG. 5 is a block diagram illustrating an example of a configuration of system software of the PC.

FIG. 5 is a block diagram illustrating a configuration of the system software of the PC 101. System software 501 is stored in any of storages such as the ROM 402, the RAM 403, and the HDD 404, and is executed by the CPU 401.

The system software 501 includes an application 502 and a printer driver 503. The application 502 is a tool that is used by a user to create and edit an image and a document while the user checks display on the display device 406 of the PC 101 by using the input device 405 including the pointing device and the keyboard. The user uses the application 502 to create data, such as an image and a document, uses the printer driver 503 to create print instruction data, and transmits the print instruction data to a printing apparatus, such as the image forming apparatus 102.

Figure 7:
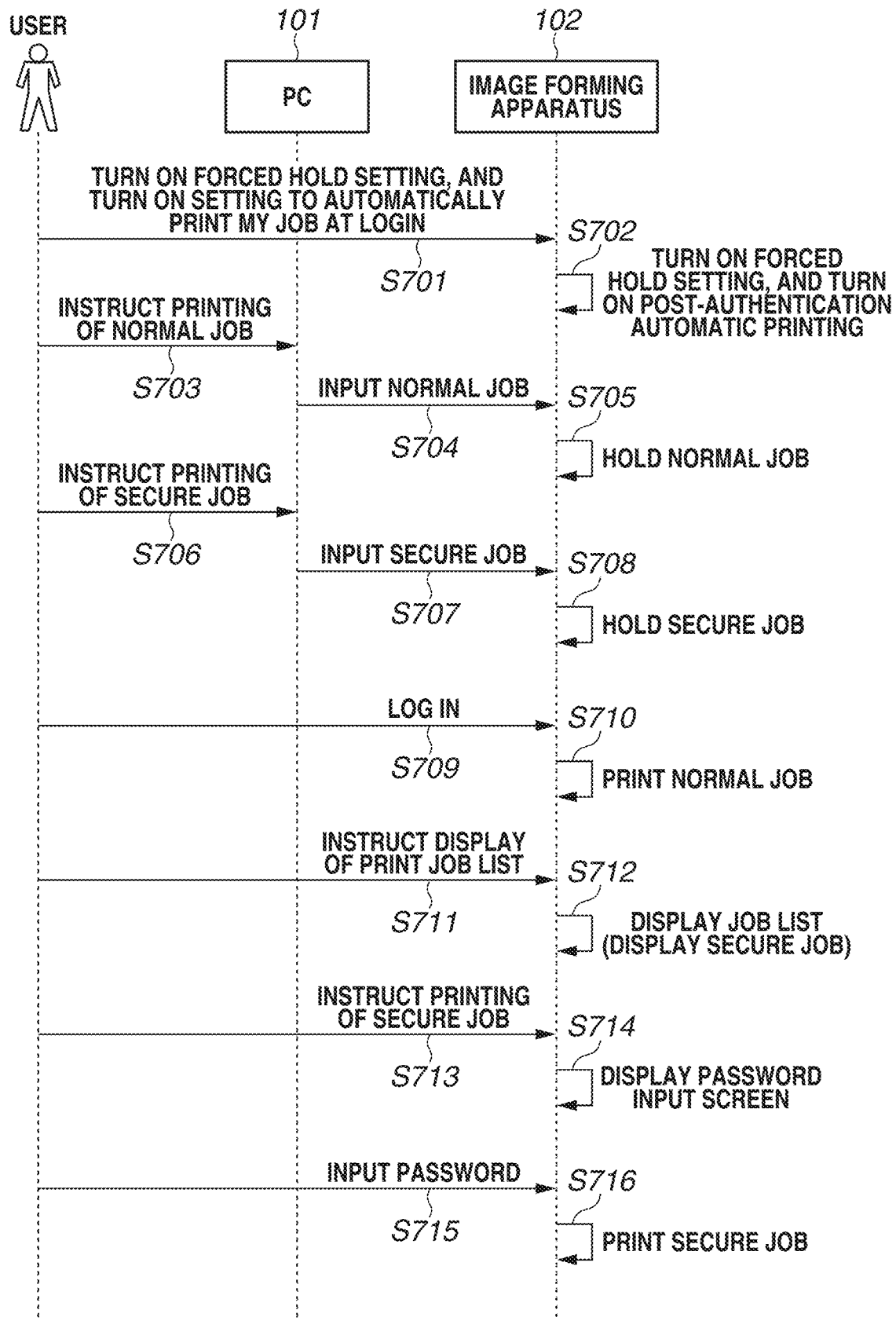
FIG. 7 is a sequence diagram illustrating an example of conventional post-authentication automatic printing.

FIG. 7 is a diagram illustrating a sequence of conventional post-authentication automatic printing. A description will be given of an example in which the user operates the PC 101 to transmit a print job to the image forming apparatus 102 and printing of the print job is performed by the image forming apparatus 102.

In step S701, the user operates the image forming apparatus 102 to turn ON the "forced hold setting" and the "setting to automatically print my job at login" (post-authentication automatic printing). In step S702, the image forming apparatus 102 stores setting values set in step S701.

In step S703, the user operates the PC 101 to instruct the image forming apparatus 102 to print a normal job for which a password is not set, etc. In step S704, the PC 101 inputs the normal job. In step S705, the image forming apparatus 102 holds the normal job.

In step S706, the user operates the PC 101 to instruct the image forming apparatus 102 to print a secure job for which a password has been set. In step S707, the PC 101 inputs the secure job. In step S708, the image forming apparatus 102 holds the secure job.

In step S709, the user performs user authentication in the image forming apparatus 102 to log in to the image forming apparatus 102. In step S710, the image forming apparatus 102 prints the normal job held in step S705. In this process, the secure job held in step S708 is not printed because password verification has not been completed. In addition, the secure job is not printed in a case where the secure job is excluded from the target of the post-authentication automatic printing because the normal job and the secure job are managed by different job lists, etc.

In step S711, the user operates the image forming apparatus 102 to instruct the image forming apparatus 102 to display a print job list. In step S712, the image forming apparatus 102 displays a print job list screen including the secure job held in step S708.

In step S713, the user operates the image forming apparatus 102 to select the secure job in the print job list screen, and instructs the image forming apparatus 102 to print the selected secure job. In step S714, the image forming apparatus 102 displays a password input screen on the operation unit. In step S715, the user operates the operation unit of the image forming apparatus 102 to input a password. In step S716, the image forming apparatus 102 prints the secure job.

As described above, the secure job that is a print job for which a password has been set is excluded from the target of the post-authentication automatic printing in the conventional technology. Thus, to print the secure job, it is necessary for the user to instruct the image forming apparatus 102 to display the job list, to select the target job and to instruct the image forming apparatus 102 to print the selected target job.

Figure 8:
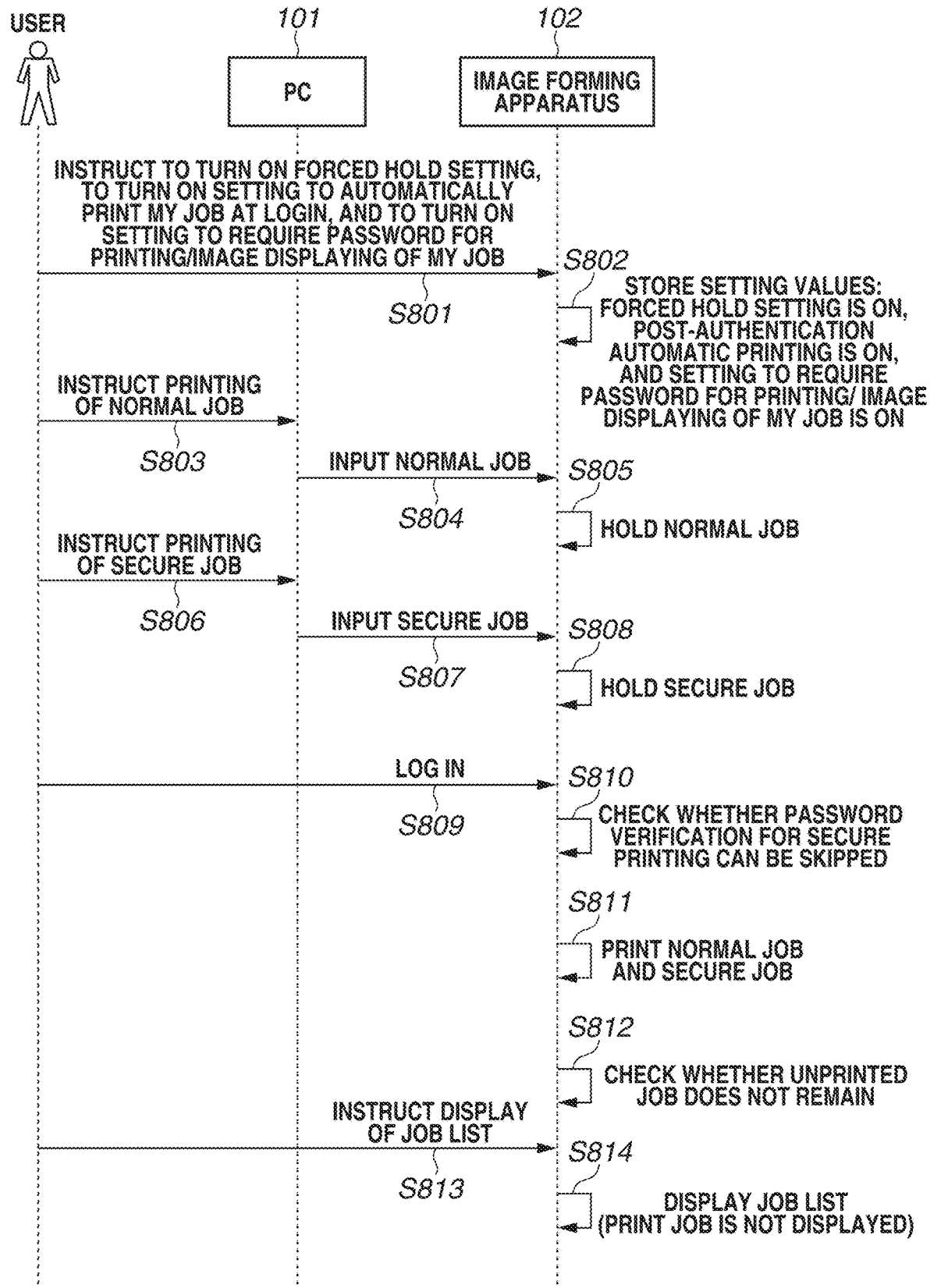
FIG. 8 is a sequence diagram illustrating an example of post-authentication automatic printing according to an exemplary embodiment.

FIG. 8 is a diagram illustrating a sequence of the post-authentication automatic printing according to the present exemplary embodiment. A description will be given of an example in which the user operates the PC 101 to transmit a print job to the image forming apparatus 102 and the printing is performed by the image forming apparatus 102.

In step S801, the user operates the image forming apparatus 102 to turn ON the "forced hold setting", the "setting to automatically print my job at login", and a "setting to require password for printing/image displaying of my job". The "setting to require password for printing/image displaying of my job" is a setting for determining whether password verification of the secure job can be skipped. In a case where the setting is ON, the secure job can be printed without input/verification of the password when the user authentication to the image forming apparatus 102 succeeds. In step S802, the image forming apparatus 102 stores setting values set in step S801.

Description of the processing in step S803 to S809 is omitted because the processing is not changed from the existing processing.

In step S810, the image forming apparatus 102 checks whether the password verification for the secure job can be skipped. In this example, since the "setting to require password for printing/image displaying of my job" is turned ON in step S801, it is determined that the password verification can be skipped. In a case where the password verification cannot be skipped, the traditional sequence from steps S710 to S716 is executed.

In step S811, the image forming apparatus 102 prints the normal job held in step S805 and the secure job held in step S808. Since the password verification for the secure print can be skipped and the user authentication has succeeded in step S809, additional input of the password for printing of the secure job is skipped.

In step S812, the image forming apparatus 102 checks whether unprinted print job does not remain.

In step S813, the user operates the image forming apparatus 102 to instruct the image forming apparatus 102 to display the print job list. In step S814, the image forming apparatus 102 displays the print job list screen. Since the normal job input in step S804 and the secure job input in step S807 have been already printed in step S811, no print job is displayed in the print job list.

As described above, the secure job that is a print job for which a password has been set can be included in the target of the post-authentication automatic printing. Therefore, even the secure job can be automatically printed in response to login of the user in a manner similar to the normal job.

Each processing is described in detail below.

A description will be given of a method in which the user operates the image forming apparatus 102 to change the setting of the image forming apparatus 102 according to the present exemplary embodiment. The description corresponds to the processing in steps S801 and S802.

Figure 13:
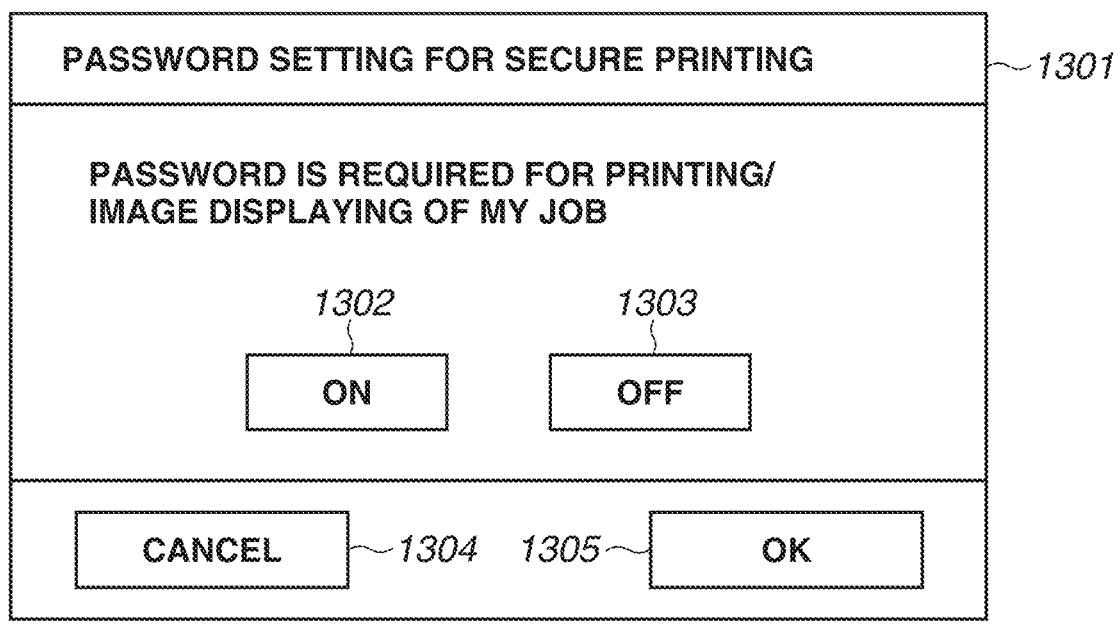
FIG. 13 is a diagram illustrating an example of a setting screen of a setting for whether a password is required for secure job printing.
Figure 18:
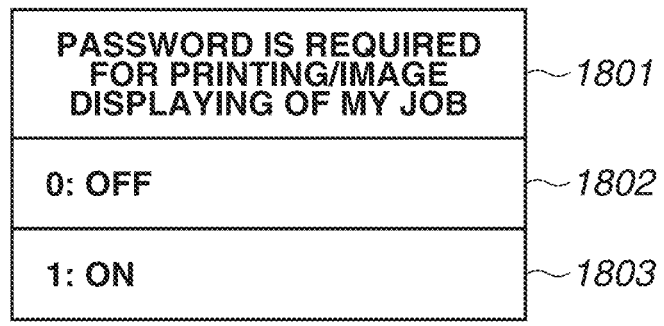
FIG. 18 is a diagram illustrating an example of an internally-managed setting value of a setting with which a password is required for secure job printing.

FIG. 13 is a diagram illustrating an example of a setting screen of a setting for whether to require a password for printing of the secure job in the system software 301, executed by the CPU 202 of the image forming apparatus 102. In this setting screen, the "setting to require password for printing/image displaying of my job" can be changed. When the setting is turned ON, the password is required for printing of the secure job. When the setting is turned OFF, the password is unnecessary for printing of the secure job. When the user selects an ON button 1302 or an OFF button 1303 and presses an OK button 1305, the storage control unit 305 stores a setting value in the HDD 205. When the user presses a cancel button 1304, the UI control unit 302 terminates display of this setting screen. The setting value of the setting designated by the user in this screen is managed using a table illustrated in FIG. 18 and is held by the HDD 205. The job management unit 307 can refer to a setting value 1801 at an optional timing.

Figure 16:
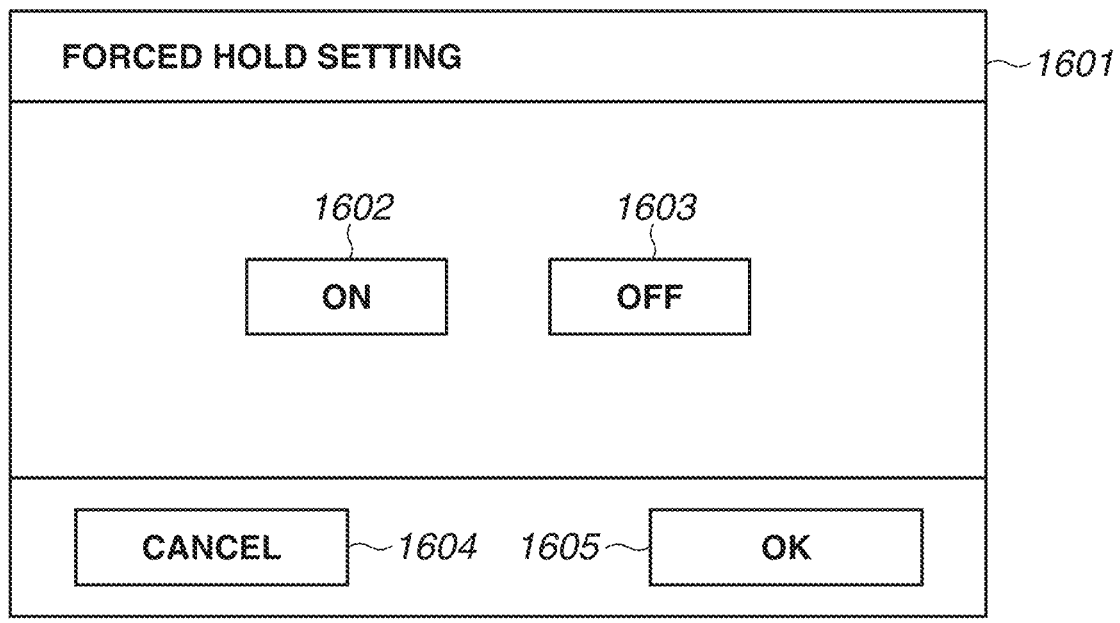
FIG. 16 is a diagram illustrating an example of a setting screen for setting a forced hold setting.
Figure 19:
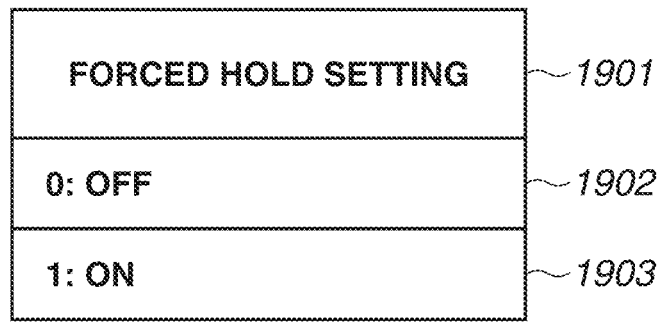
FIG. 19 is a diagram illustrating an example of an internally-managed setting value of the forced hold setting.

FIG. 16 is a diagram illustrating an example of a setting screen for setting the forced hold setting in the system software 301, executed by the CPU 202 of the image forming apparatus 102. When the setting is turned ON, the print job input to the image forming apparatus 102 is forcibly stored (held) in the HDD 205. In a case where the user prints the input print job, it is necessary for the user to operate the image forming apparatus 102. When the setting is turned OFF, the print job input to the image forming apparatus 102 is immediately printed. The hold-instructed print job and the print job for which a password has been set, however, are not immediately printed and are stored in the HDD 205. When the user selects an ON button 1602 or an OFF button 1603 and presses an OK button 1605, the storage control unit 305 stores a setting value in the HDD 205. When the user presses a cancel button 1604, the UI control unit 302 terminates display of the setting screen. The setting value of the setting designated by the user in this screen is managed by a table illustrated in FIG. 19 and is held by the HDD 205. The job management unit 307 can refer to a setting value 1901 at an optional timing.

Figure 17:
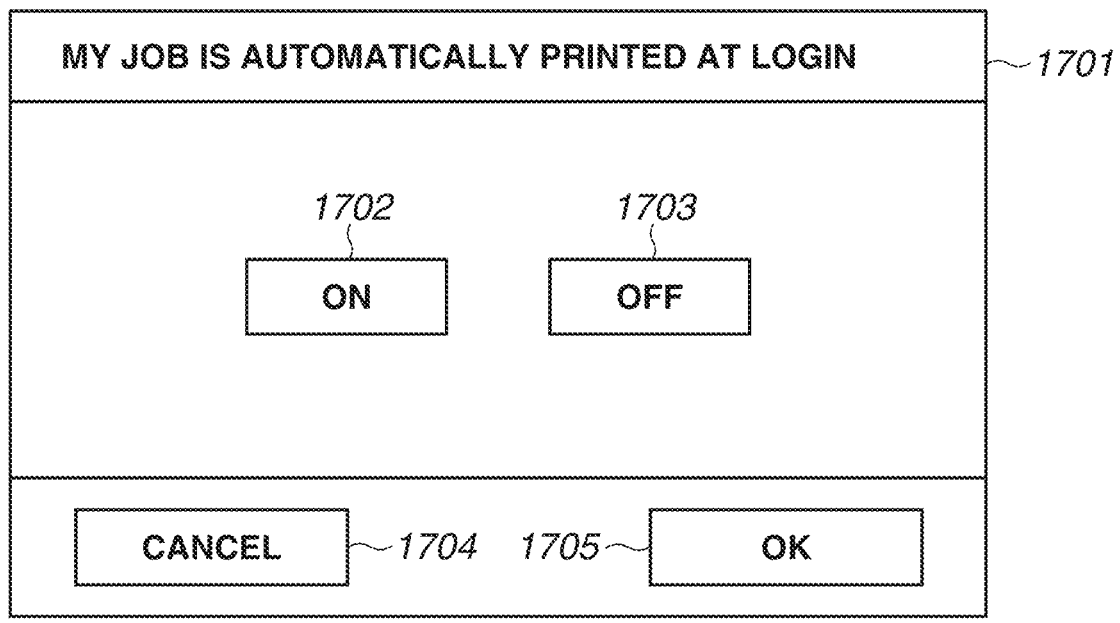
FIG. 17 is a diagram illustrating an example of a setting screen of a setting for whether to automatically print my job at login.
Figure 20:
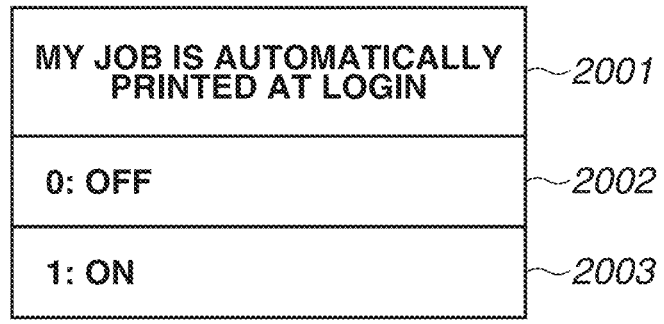
FIG. 20 is a diagram illustrating an example of an internally-managed setting value of a setting for whether to automatically print my job at login.

FIG. 17 is a diagram illustrating an example of a setting screen of a setting for whether to automatically print my job at user's login to the system software 301, executed by the CPU 202 of the image forming apparatus 102. When the setting is turned ON, the print job of the user stored in the HDD 205 is (automatically) printed without a printing instruction from the user, in response to the user's login to the image forming apparatus 102. When the setting is turned OFF, printing of the print job is not executed in response to the user's login to the image forming apparatus 102. In the case where the user prints the input print job, it is necessary for the user to operate the image forming apparatus 102 to select the stored print job, and to instruct the image forming apparatus 102 to print the selected print job. When the user selects an ON button 1702 or an OFF button 1703 and presses an OK button 1705, the storage control unit 305 stores a setting value in the HDD 205. When the user presses a cancel button 1704, the UI control unit 302 terminates display of the setting screen. The setting value of the setting designated by the user in this screen is managed using a table illustrated in FIG. 20 and is held by the HDD 205. The job management unit 307 can refer to a setting value 2001 at an optional timing.

A description will be given of print job input processing. The description corresponds to the processing in steps S803 to S808.

Figure 9:
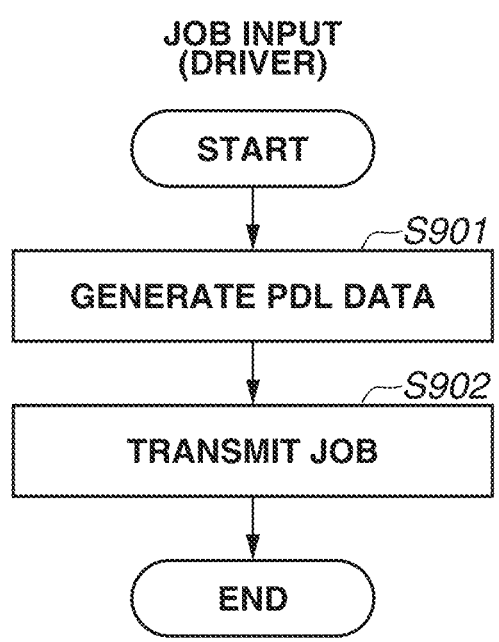
FIG. 9 is a flowchart illustrating an example of print job input processing.

FIG. 9 is a flowchart illustrating the print job input processing executed by the CPU 401 of the PC 101. According to the present exemplary embodiment, the print job is input from the PC 101 to the image forming apparatus 102.

The user creates data, such as an image and a document, by the application 502 with use of the input device 405, such as the pointing device and the keyboard, while viewing the display device 406, and then instructs the image forming apparatus 102 to print the created data. In step S901, the printer driver generates a page description language (PDL) data based on the data, such as the image and the document, a document attribute including a document name, and print setting information set to the printer driver for when the printing is instructed. In a case where the secure job is printed, a password included in the print setting information is added to the PDL data. Further, in step S902, the printer driver transmits the PDL data as a print job to the image forming apparatus 102.

FIG. 10 is a flowchart illustrating print job storing processing in the system software 301, executed by the CPU 202 of the image forming apparatus 102. According to the present exemplary embodiment, the print job is input from the PC 101 to the image forming apparatus 102.

When the image forming apparatus 102 receives the print job from the PC 101 in step S1001, the network control unit 306 transmits the print job to the job management unit 307. In step S1002, the job management unit 307 receives the print job and performs determination of whether to store the print job. Detail of the processing in step S1002 is described below. In step S1003, the job management unit 307 determines whether to store the print job as a result of the processing in step S1002. In a case where the print job is not stored (NO in step S1003), the job management unit 307 requests the job control unit 308 to perform the print job, and the job control unit 308 performs printing in step S1007. In a case where the print job is stored (YES in step S1003), the job management unit 307 transmits the print job to the data management unit 304. In step S1004, the data management unit 304 analyzes the print job received from the job management unit 307 to extract bibliographic information. The bibliographic information is described below. Further, the data management unit 304 transmits the print job and the extracted bibliographic information to the storage control unit 305. In steps S1005 and S1006, the storage control unit 305 stores the received print job and the extracted bibliographic information in the HDD 205.

FIG. 11 is a flowchart illustrating the print job storing determination in step S1002 in the system software 301, executed by the CPU 202 of the image forming apparatus 102.

In step S1101, the job management unit 307 analyzes the print job and determines whether the storing setting is valid. In a case where the storing setting has been valid (YES in step S1101), the processing proceeds to step S1105. In step S1105, the job management unit 307 determines to store the print job. In a case where the storing setting is not valid (NO in step S1101), the processing proceeds to step S1102. In step S1102, the job management unit 307 analyzes the print job and determines whether secure job setting is valid. In a case where the secure job setting is valid (YES in step S1102), the processing proceeds to step S1105. In step S1105, the job management unit 307 determines to store the print job in step S1105.

In a case where the secure job setting is not valid (NO in step S1102), the processing proceeds to step S1103. In step S1103, the job management unit 307 acquires the setting value 1901 of the forced hold setting and determines whether the forced hold setting is valid based on the setting value of the forced hold setting. In a case where the forced hold setting is valid (YES in step S1103), the processing proceeds to step S1105. In step S1105, the job management unit 307 determines to store the print job. In a case where the forced hold setting is not valid (NO in step S1103), the processing proceeds to step S1104. In step S1104, the job management unit 307 determines not to store the print job in step S1104.

FIG. 12 is a diagram illustrating an example of a bibliographic information table. The bibliographic information table includes items of a date 1202 on which the print job has been input, a user name 1203 of the user who has input the print job, a storage 1204 where the input print job is stored, a print job name 1205, a print setting 1206, a print job type 1207, and a password 1208. The user name 1203 is user identification information, and the print job name 1205 is print data identification information. For the print job having a job type of secure job as indicated in the print job type 1207, a password indicated in the password 1208 has been set. In a case where the normal job and the secure job are managed using different bibliographic information lists, the print job type 1207 may not be managed as the bibliographic information. Bibliographic information 1209 to 1216 of respective print jobs are illustrated.

Next, printing processing is described. The description corresponds to the processing in steps S809 to S814.

A description will be given of processing for registering a user who is allowed to use the image forming apparatus 102. This registration processing is to be previously performed by the user.

FIG. 6 is a table illustrating an example of a user management list 601 managed by the image forming apparatus 102. The UI control unit 302 displays a not illustrated user management input screen on the operation unit 207 via the operation unit I/F 206, and receives user input. When receiving the user input from the operation unit 207 via the operation unit I/F 206, the UI control unit 302 performs notification to the data management unit 304. The data management unit 304 performs notification to the storage control unit 305, and updates the user management list 601 stored in the HDD 205. Information in the user management list 601 is readable and writable by the data management unit 304 at an optional timing.

A user name 602 indicates a user using the image forming apparatus 102. A password 603 indicates a password of the user of the user name 602. An E-mail address 604 indicates an E-mail address of the user of the user name 602. A department identification (ID) 605 is an ID of a department to which the user of the user name 602 belongs. A role name 606 indicates authority provided to the user of the user name 602. For example, in a case where the user has administrator authority of the image forming apparatus 102, the role name 606 becomes Administrator. In a case of a general user, the role name 606 becomes GeneralUser. User information 607 corresponds to the user having the user name 602 of Administrator. User information 608 to 610 correspond to respective general users each using the image forming apparatus 102. The user management input screen is desirably operated only by the user having the administrator authority.

A description will be given of processing in which the user is authenticated by operating the image forming apparatus 102 and logs in to the image forming apparatus 102.

Figure 14:
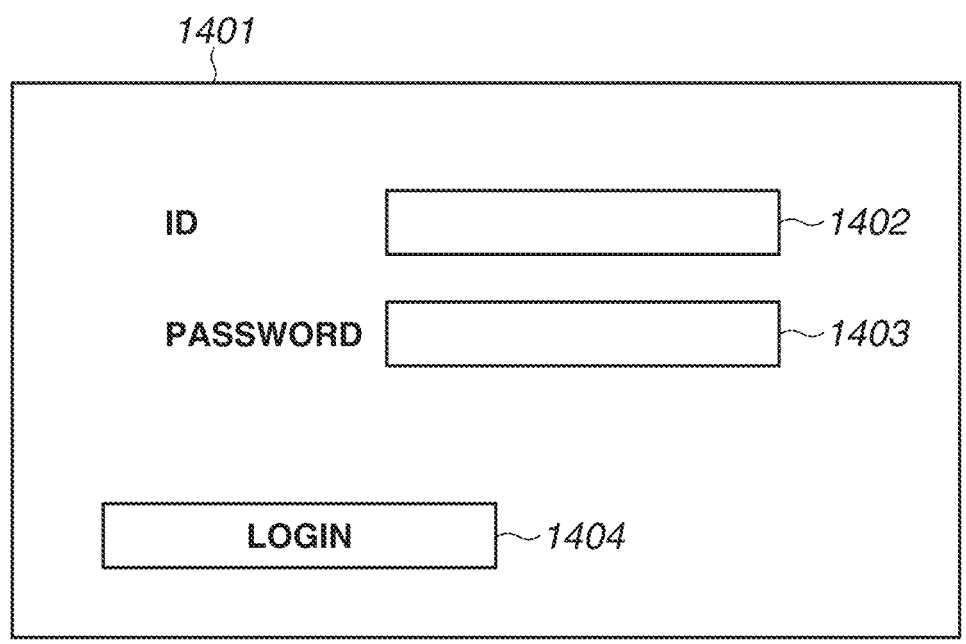
FIG. 14 is a diagram illustrating an example of a user authentication screen.

FIG. 14 is a diagram illustrating an example of a user authentication screen in the system software 301, executed by the CPU 202 of the image forming apparatus 102. The user inputs user name in an ID field 1402 and a password in a PASSWORD field 1403 in a user authentication screen 1401, and presses a login button 1404, to request the authentication unit 303 for user authentication. The authentication unit 303 verifies the information input in the user authentication screen 1401 and the user management list 601 to perform user authentication, and performs optional processing corresponding to a result of the user authentication.

Figure 21:
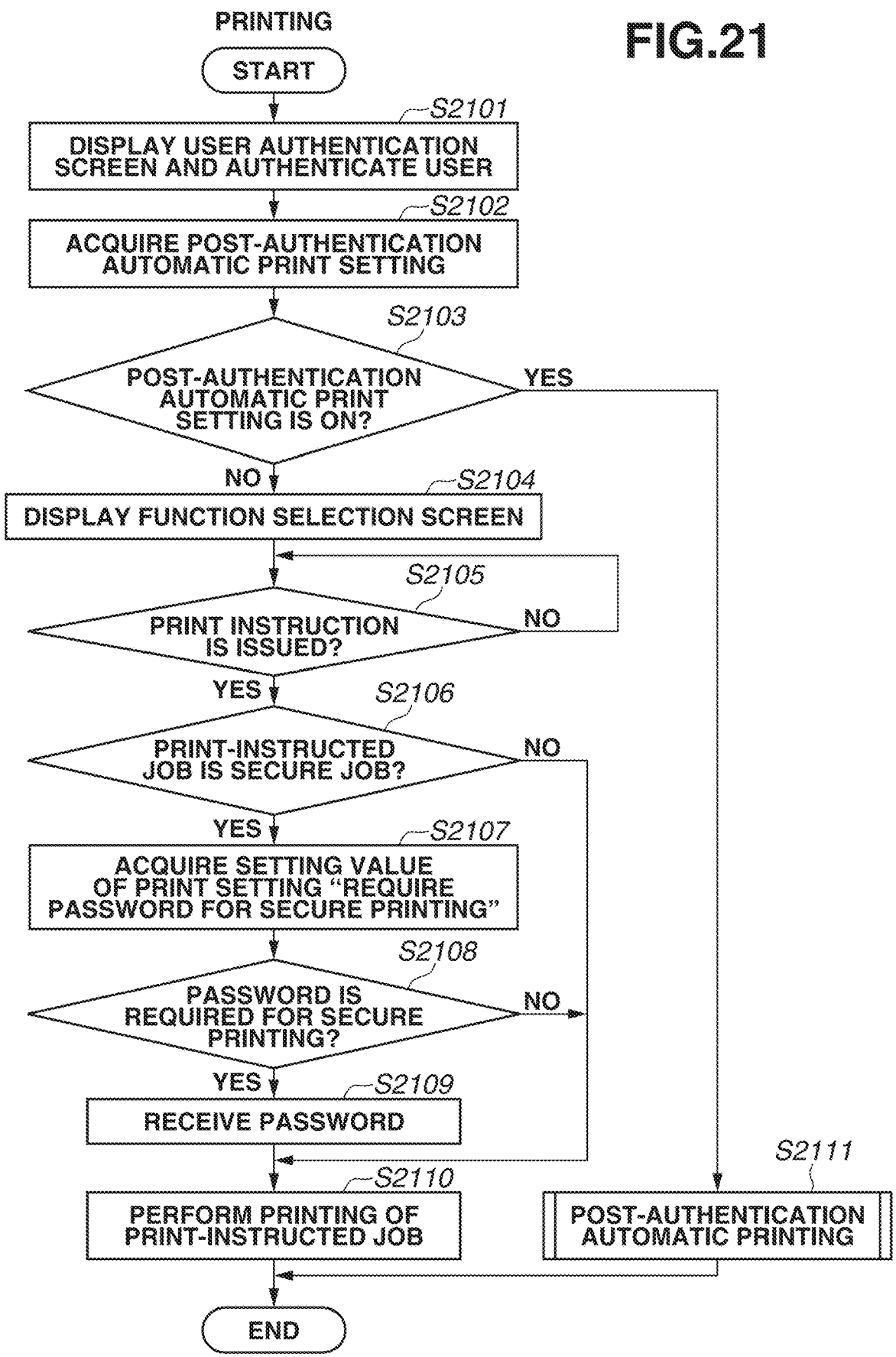
FIG. 21 is a flowchart illustrating an example of printing control processing.

The details of the printing processing is further described with reference to a flowchart and drawings. FIG. 21 is a flowchart illustrating printing control processing in the system software 301, executed by the CPU 202 of the image forming apparatus 102.

In step S2101, the authentication unit 303 displays the user authentication screen described with reference to FIG. 14, and performs the user authentication based on the authentication information input by the user. In this example, the user is authenticated as a genuine user. When the user authentication succeeds, the user can log in to the image forming apparatus 102.

After the user authentication succeeds, in step S2102, the job management unit 307 acquires the setting value 2001 of the setting for whether to automatically print my job at login. In step S2103, the job management unit 307 determines whether to perform the post-authentication automatic printing, based on the setting value of the setting for whether to automatically print my job at login. In a case where the post-authentication automatic printing is performed as a result of the determination in step S2103 (YES in step S2103), the processing proceeds to step S2111. In step S2111, the job management unit 307 performs processing of the post-authentication automatic printing. The details of the processing in step S2111 will be described below.

In a case where the post-authentication automatic printing is not performed as a result of the determination in step S2103 (NO in step S2103), the processing proceeds to step S2104. In step S2104, the UI control unit 302 displays a function selection screen on the operation unit 207.

Figure 22:
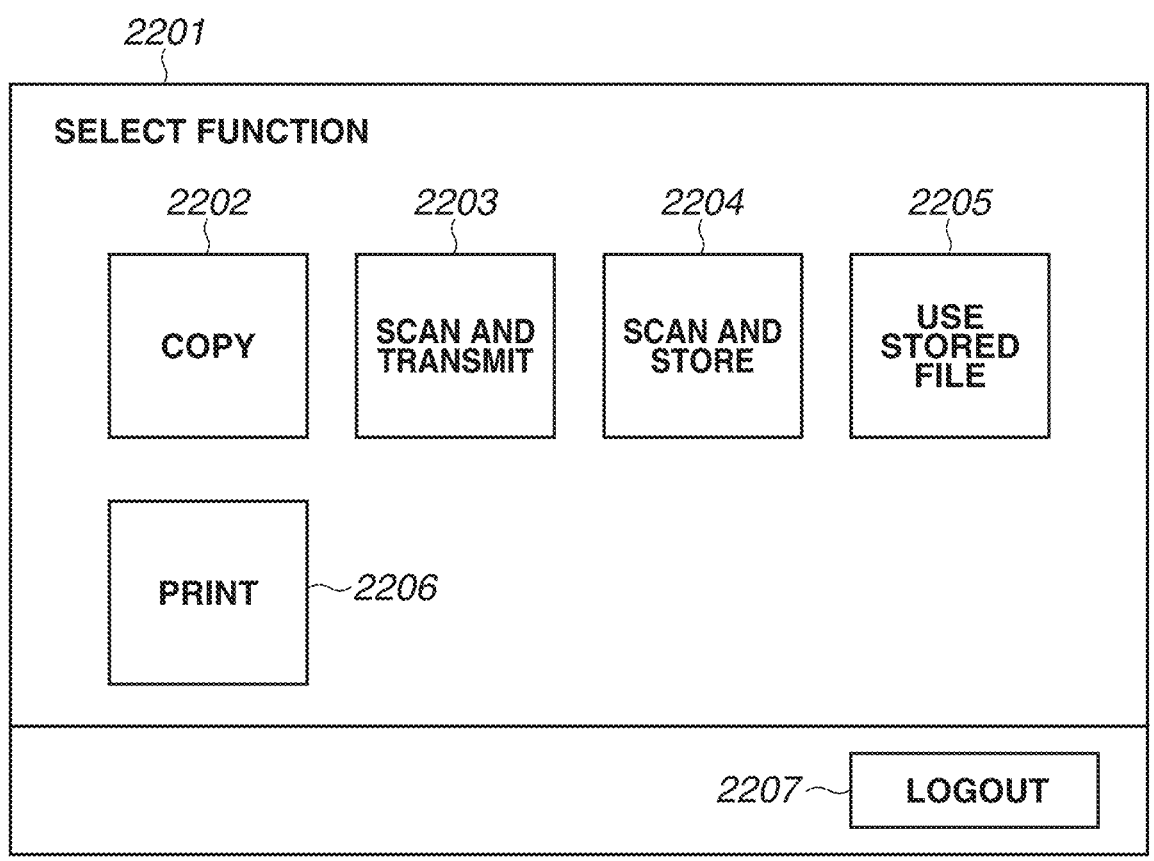
FIG. 22 is a diagram illustrating an example of a function selection screen.

FIG. 22 is a diagram illustrating an example of the function selection screen. The user can select a desired function from a plurality of functions of the image forming apparatus 102 in this screen. Examples of the selectable functions include a copy function 2202, a scan and transmission function 2203, a scan and storing function 2204, a use stored file function 2205, and a print function 2206. When the user selects any of the functions 2202 to 2205, the UI control unit 302 displays a function screen corresponding to the selected function. When the user selects the print function 2206, the UI control unit 302 displays a print function screen 2300 illustrated in FIG. 23 on the operation unit 207. When the user presses a logout button 2207, the authentication unit 303 performs logout processing, and the UI control unit 302 displays the user authentication screen 1401 on the operation unit 207.

FIG. 23 is a diagram illustrating an example of the print function screen. In this screen, the user can performs operations for the held print job. When the user selects a ready-to-print button 2301, the job management unit 307 acquires the user name of the login user from the authentication unit 303. Further, the job management unit 307 retrieves the bibliographic information including the acquired user name in the bibliographic information list 1201 by searching for the bibliographic information corresponding to the login user with use of the acquired user name. In a case where there is the bibliographic information corresponding to the login user, the UI control unit 302 displays the acquired bibliographic information on the operation unit 207. For example, in a case where the user name of the login user is User1, bibliographic information 1209 to 1212 are acquired from the bibliographic information list 1201. Each pieces of the acquired bibliographic information correspond to respective pieces of bibliographic information 2317 to 2320.

When the user selects a printed button 2302, the job management unit 307 displays the bibliographic information on the print job that has been printed in the past (not illustrated). When the user selects a reserved-printing button 2303, the job management unit 307 retrieves a reserved print job set with a printing time in the bibliographic information list 1201, and displays the reserved print job (not illustrated). When the user selects an update button 2304, the job management unit 307 retrieves the bibliographic information list 1201, and the UI control unit 302 updates the displayed bibliographic information.

An item 2305 indicates job name/print setting, and the UI control unit 302 displays the same job name and the same setting as indicated in the print job name 1205 and the print setting 1206. An item 2306 indicates a date, and the UI control unit 302 performs displays the same date as indicated in the date 1202. An item 2307 indicates the number of sheets×the number of copies, and the UI control unit 302 performs displays the number of sheets which is the same as the number of sheets obtained by analysis of the print job and the print setting 1206. An item 2308 indicates a job type, and the UI control unit 302 displays "secure" in the case where the print job type 1207 is the secure job. The UI control unit 302 may display "normal" or the like as for the normal job. An item 2309 indicates the user name, and the UI control unit 302 performs display equivalent to the user name 1203. The bibliographic information 2317 to 2320 correspond respective print jobs.

When the user checks a select-all box 2310, the UI control unit 302 puts all pieces of the bibliographic information (2317 to 2320) into a selected state. When the user selects any of the bibliographic information 2317 to 2320 and then selects a print setting button 2311, the UI control unit 302 displays a screen to change the print setting of the selected print job (not illustrated). When the user selects any of the bibliographic information 2317 to 2320 and then selects a job deletion button 2313, the job management unit 307 deletes the selected print job. When the user selects any of the bibliographic information 2317 to 2320 and then selects a print cancel button 2314, the job management unit 307 cancels printing processing in a case where printing of the selected print job is currently performed. When the user selects any of the bibliographic information 2317 to 2320 and then selects a print start button 2315, the job management unit 307 performs printing of the selected print job. When the user selects a logout button 2316, the authentication unit 303 performs the logout processing, and the UI control unit 302 displays the user authentication screen 1401 on the operation unit 207.

The description is given of the flowchart illustrated in FIG. 21. After the processing in step S2104, the job management unit 307 waits for a print instruction from the user in step S2105. In a case where the user issues a print instruction (YES in step S2105), the processing proceeds to step S2106. In step S2106, the job management unit 307 determines whether the job of the selected bibliographic information is a secure job. The print instruction issued from the user indicates that, for example, the user selects any of the bibliographic information 2317 to 2320 in the print function screen 2300 and then selects the print start button 2315. In step S2106. In a case where the job is not a secure job (for example, is normal job) as a result of the determination (NO in step S2106), the processing proceeds to step S2110. In step S2110, the job management unit 307 performs printing of the print-instructed normal job.

In step S2106, in a case where the job is a secure job as a result of the determination (YES in step S2106), the processing proceeds to step S2107. In step S2107, the job management unit 307 acquires the setting value 1801 of the "setting to require password for printing/image displaying of my job". In step S2108, the job management unit 307 determines whether the password is required for printing of the secure job, based on the setting value of the "setting to require password for printing/image displaying of my job". In step S2108, in a case where the password is not required for printing of the secure job as a result of the determination (NO in step S2108), the processing proceeds to step S2110. In step S2110, the job management unit 307 performs printing of the print-instructed secure job.

In step S2108, in a case where the password is required for printing of the secure job as a result of the determination (YES in step S2108), the processing proceeds to step S2109. In step S2109, the UI control unit 302 displays a not illustrated password input screen and receives input of the password. After a correct password is received in step S2109, the processing proceeds to step S2110. In step S2110, the job management unit 307 performs printing of the print-instructed secure job.

A description will be given of the post-authentication automatic printing that automatically starts printing of the print job of the login user in response to login of the user to the image forming apparatus 102. The description corresponds to the processing in step S811.

Figure 15:
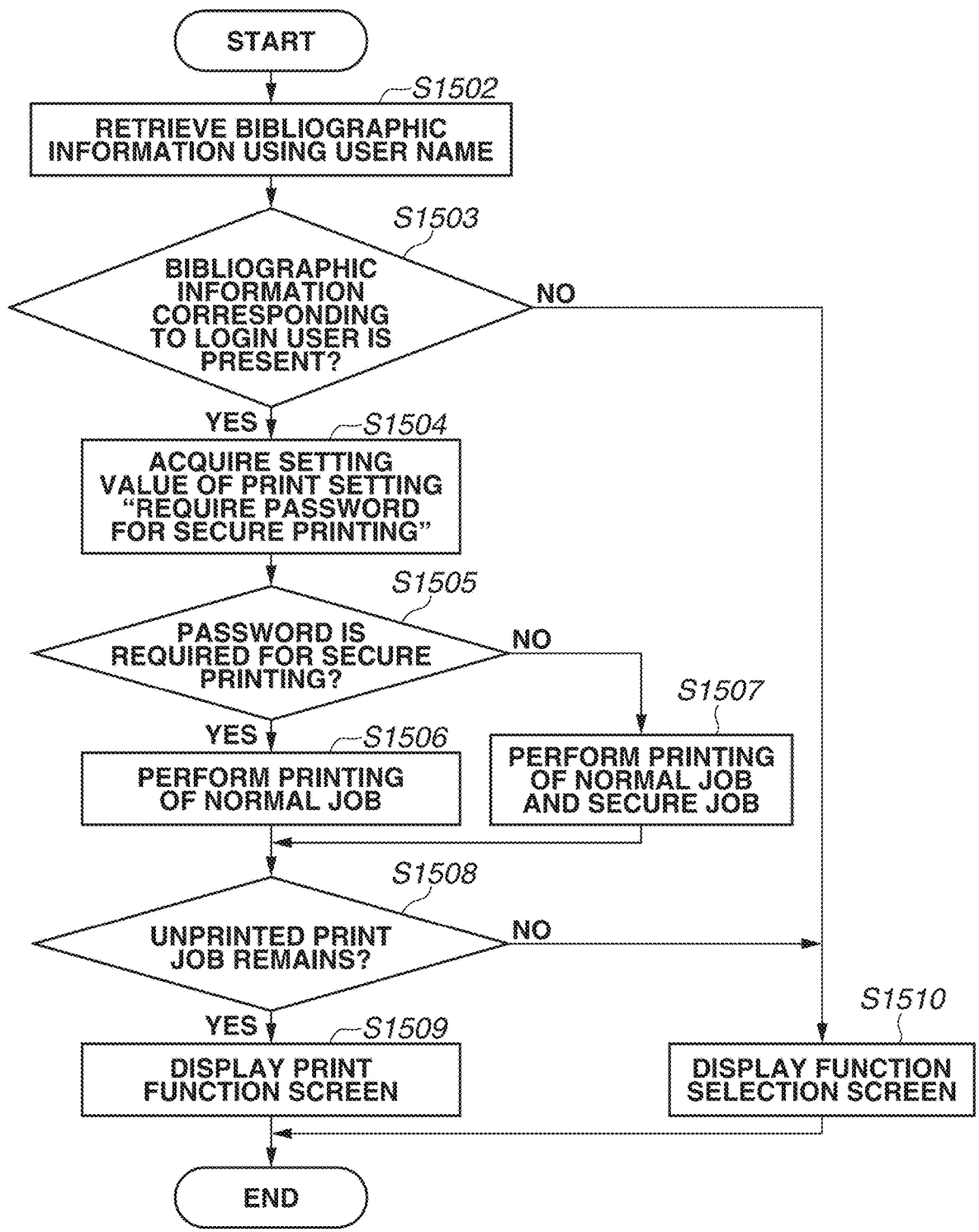
FIG. 15 is a flowchart illustrating an example of automatic printing control processing.

FIG. 15 is a flowchart illustrating the processing of the post-authentication automatic printing control in the system software 301, executed by the CPU 202 of the image forming apparatus 102.

The job management unit 307 acquires the user name of the login user authenticated in step S2101, from the authentication unit 303. In step S1502, the job management unit 307 retrieves the bibliographic information corresponding to the login user by searching for the bibliographic information including the acquired user name in the bibliographic information list 1201. In step S1503, the job management unit 307 determines whether there is the bibliographic information corresponding to the login user as a result of the searching. For example, in the case where the user name of the login user is User1, the bibliographic information 1209 to 1211 are acquired from the bibliographic information list 1201. In step S1503, in a case where there is no bibliographic information corresponding to the login user as a result of the determination (NO in step S1503), the processing proceeds to step S1510.

In step S1503, in a case where there is the bibliographic information corresponding to the login user as a result of the determination (YES in step S1503), the processing proceeds to step S1504. In step S1504, the job management unit 307 acquires the setting value 1801 of the "setting to require password for printing/image displaying of my job". In step S1505, the job management unit 307 determines whether the password is required for printing of the secure job, based on the acquired setting value of the "setting to require password for printing/image displaying of my job".

In step S1505, in a case where the password is required for printing of the secure job as a result of the determination (YES in step S1505), the processing proceeds to step S1506. In step S1506, the job management unit 307 performs, among the bibliographic information acquired in step S1503, printing of the print job having the print job type 1207 of the normal job. For example, the job management unit 307 performs printing of the print jobs corresponding to the bibliographic information 1209 and 1210, among the bibliographic information 1209 to 1212 acquired in the previous example.

In step S1505, in a case where the password is not required for printing of the secure job as a result of the determination (NO in step S1505), the processing proceeds to step S1507. In step S1507, the job management unit 307 performs subsequent processing. In other words, in step S1507, the job management unit 307 performs printing of the print job having the print job type 1207 of the normal job and the print job having the print job type 1207 of the secure job, among the bibliographic information acquired in step S1503. For example, printing of all of the print jobs corresponding to the bibliographic information 1209 to 1212 acquired in the previous example is performed.

After the printing processing is completed, in step S1508, the job management unit 307 determines whether an unprinted print job remains in the bibliographic information list 1201. In step S1508, in a case where an unprinted print job remains as a result of the determination (YES in step S1508), the processing proceeds to step S1509. In step S1509, the UI control unit 302 receives the bibliographic information on the unprinted print job from the job management unit 307, and displays the print function screen on the operation unit 207. In step S1508, in a case where an unprinted print job does not remain as a result of the determination (NO in step S1508), the processing proceeds to step S1510. In step S1510, the UI control unit 302 displays the function selection screen on the operation unit 207.

For example, in a case where the processing in step S1506 is performed while the normal job and the secure job are held, the secure job is not printed and remains. Therefore, the determination result in step S1508 becomes YES, and the processing in step S1509 is performed. In step S1509, a print function screen 2400 illustrated in FIG. 24 is displayed. In the print function screen 2400, the bibliographic information on the printed normal job is not displayed and the bibliographic information 2417 and 2418 of the unprinted secure jobs are displayed.

Further, for example, in a case where the processing in step S1507 is performed while the normal job and the secure job are held, the unprinted print job does not remain because both of the normal job and the secure job are printed. Accordingly, the determination result in step S1508 becomes NO, and the processing in step S1510 is performed. After the processing in step S1510, when the print function screen is displayed in response to the instruction from the user, a screen illustrated in FIG. 25 is displayed. In a print function screen 2500, no bibliographic information is displayed.

As described above, in step S1505, determination of whether to require a password for printing of the secure job is performed to verify whether not only the normal job and also the secure job is included in the target of the automatic printing. In a case where there is a target secure job, the post-authentication automatic printing is performed in step S1507. By this processing, the print job for which a password has been set can be printed by the post-authentication automatic printing in an operation mode in which the password verification can be skipped, which makes it possible to reduce user's operation labor in printing.

In a case where the unprinted print job remains as a result of the determination of whether the unprinted print job remains after the post-authentication automatic printing is performed, the print function screen is displayed. The bibliographic information on the unprinted print job is displayed in the print function screen. Therefore, it is possible to immediately start the printing processing of the unprinted print job without an instruction for displaying the print function screen by the user.

The exemplary embodiment is not limited to the exemplary embodiment described in the present exemplary embodiment as long as effects similar to the effects by the present exemplary embodiment can be achieved. While, according to the present exemplary embodiment, the secure job has been described as an example of the print job that is not printed in the post-authentication automatic printing (excluded from target of post-authentication automatic printing), for example, the print job not printed is not limited to the secure job. For example, the print job may be encrypted, and an encrypted secure job that requires password input for printing may be included. Further, a shared job that is printable by a plurality of users may be included. Further, a print job input by a user other than the authenticated user may be included. Moreover, a print job input to an image forming apparatus different from the image forming apparatus performing printing may be included.

For example, in the case where the normal job and the secure job are managed by different bibliographic information lists, the post-authentication automatic printing of the normal job is performed. After the post-authentication automatic printing of the normal job, bibliographic information list for the other job (e.g., secure job) is retrieved. When the print job printable by the authenticated user is present, the automatic printing of the print job may be performed. Further, the other print job is not limited to the secure job.

As described above, according to the present exemplary embodiment, in a case where the print data for which a password has been set is held in the image forming apparatus including the post-authentication automatic printing function, the user can set whether to include the print data in the target of the post-authentication automatic printing. In a case where the print data for which a password has been set is set as a target of the post-authentication automatic printing, the print data for which a password has been set is automatically printed together with the normal print data registered in association with the user, in response to login of the user. In a case where the print data for which a password has been set is set to be excluded from the target of the post-authentication automatic printing, only the normal print data is automatically printed in response to login of the user. After printing of the normal print data is completed, a list of the unprinted print data is automatically displayed. This enables the user to immediately instruct the image forming apparatus to print the print data for which a password has been set via the list screen, which improves usability of the user.

OTHER EMBODIMENTS

Embodiments of the present disclosure can also be realized by a computer of a system or apparatus that reads out and executes computer executable instructions recorded on a storage medium (e.g., non-transitory computer-readable storage medium) to perform the functions of one or more of the above-described embodiment(s) of the present disclosure, and by a method performed by the computer of the system or apparatus by, for example, reading out and executing the computer executable instructions from the storage medium to perform the functions of one or more of the above-described embodiment(s). The computer may comprise one or more of a central processing unit (CPU), micro processing unit (MPU), or other circuitry, and may include a network of separate computers or separate computer processors. The computer executable instructions may be provided to the computer, for example, from a network or the storage medium. The storage medium may include, for example, one or more of a hard disk, a random-access memory (RAM), a read only memory (ROM), a storage of distributed computing systems, an optical disk (such as a compact disc (CD), digital versatile disc (DVD), or Blu-ray Disc (BD)™), a flash memory device, a memory card, and the like.

While the present disclosure has been described with reference to exemplary embodiments, it is to be understood that the invention is not limited to the disclosed exemplary embodiments. The scope of the following claims is to be accorded the broadest interpretation so as to encompass all such modifications and equivalent structures and functions.

This application claims the benefit of Japanese Patent Application No. 2018-100076, filed May 24, 2018, which is hereby incorporated by reference herein in its entirety.

What is claimed is:

1. An image forming apparatus comprising:
a printing device;
a display device;
at least one memory that stores a set of instructions, wherein a setting indicating whether password input on the display device for performing a print job for which a password has been set is skipped is stored in the at least one memory; and
at least one processor that executes the instructions to:
receive login of a user to the image forming apparatus;
cause, according to login of the user to the image forming apparatus, the printing device to perform a print job with the login user stored in the at least one memory in association with the login user and for which a password has not been set, and not to perform a print job which is stored in the at least one memory in association with the login user and for which a password has been set, in a case where the setting indicates that password input on the display device for performing a print job for which a password has been set is not skipped;
cause, according to login of the user to the image forming apparatus, the printing device to perform a print job which is stored in the at least one memory in association with the login user and for which a password has not been set and a print job which is stored in the at least one memory in association with the login user and for which a password has been set, in a case where the setting indicates that password input on the display device for performing a print job for which a password has been set is skipped;
display, without a user input, on the display device, a selection screen for receiving an operation to select the print job which has not been performed, in a case where a print job which has not been performed according to the login of the user to the image forming apparatus is stored in the at least one memory after the print job is performed; and
display, without a user input, on the display device, a predetermined screen which is different from the selection screen, in a case where a print job which has not been performed according to the login of the user to the image forming apparatus is not stored in the at least one memory after the print job is performed,
wherein the selection screen for receiving an operation to select the print job stored in the at least one memory in association with the login user and for which a password has been set as a print job which has not been performed according to the login of the user to the image forming apparatus is displayed after the print job which is stored in the at least one memory in association with the login user and for which a password has not been set is performed, in a case where the setting indicates that password input on the display device for performing a print job for which a password has been set is not skipped.

2. The image forming apparatus according to claim 1, wherein the selection screen includes a display item for selecting encrypted print data.

3. The image forming apparatus according to claim 1, wherein the predetermined screen displayed on the display device is a screen for allowing the login user to select a function to be used from among functions of the image forming apparatus.

4. A method of controlling an image forming apparatus comprising:
receiving login of a user to the image forming apparatus;
causing, according to login of the user to the image forming apparatus, a printing device to perform a print job which is stored in at least one memory in association with the login user and for which a password has not been set, and not to perform a print job which is stored in the at least one memory in association with the login user and for which a password has been set, in a case where the setting indicates that password input on a display device for performing a print job for which a password has been set is not skipped;
causing, according to login of the user to the image forming apparatus, the printing device to perform a print job which is stored in the at least one memory in association with the login user and for which a password has not been set and a print job which is stored in the at least one memory in association with the login user and for which a password has been set, in a case where the setting indicates that password input on the display device for performing a print job for which a password has been set is skipped;
displaying, without user input, on the display device, a selection screen for receiving an operation to select the print job which has not been performed, in a case where a print job which has not been performed according to the login of the user to the image forming apparatus is stored in the at least one memory after the print job is performed; and
displaying, without a user input, on the display device, a predetermined screen which is different from the selection screen, in a case where a print job which has not been performed according to the login of the user to the image forming apparatus is not stored in the at least one memory after the print job is performed, wherein the selection screen for receiving an operation to select the print job stored in the at least one memory in association with the login user and for which a password has been set as a print job which has not been performed according to the login of the user to the image forming apparatus is displayed after the print job which is stored in the at least one memory in association with the login user and for which a password has not been set is performed, in a case where the setting indicates that password input on the display device for performing a print job for which a password has been set is not skipped.

5. A non-transitory computer readable storage medium storing a method of controlling an image forming apparatus, the method comprising:

receiving login of a user to the image forming apparatus;

causing, according to login of the user to the image forming apparatus, a printing device to perform a print job which stored in at least one memory in association with the login user and for which a password has not been set, and not to perform a print job which is stored in the at least one memory in association with the login user and for which a password has been set, in a case where the setting indicates that password input on a display device for performing a print job for which a password has been set is not skipped;

causing, according to login of the user to the image forming apparatus, the printing device to perform a print job which is stored in the at least one memory in association with the login user and for which a password has not been set and a print job which is stored in the at least one memory in association with the login user and for which a password has been set, in a case where the setting indicates that password input on the display device for performing a print job for which a password has been set is skipped;

displaying, without a user input, on the display device, a selection screen for receiving an operation to select the print job which has not been performed, in a case where a print job which has not been performed according to the login of the user to the image forming apparatus is stored in the at least one memory after the print job is performed; and display, without a user input, on the display device, a predetermined screen which is different from the selection screen, in a case where a print job which has not been performed according to the login of the user to the image forming apparatus is not stored in the at least one memory after the print job is performed, wherein the selection screen for receiving an operation to select the print job stored in the at least one memory in association with the login user and for which a password has been set as a print job which has not been performed according to the login of the user to the image forming apparatus is displayed after the print job which is stored in the at least one memory in association with the login user and for which a password has not been set is performed, in a case where the setting indicates that password input on the display device for performing a print job for which a password has been set is not skipped.

\* \* \* \* \*